United States Patent Office 2,996,529
Patented Aug. 15, 1961

2,996,529
PREPARATION OF DIETHYL ALUMINUM CHLORIDE
Harmannus Bos, Geleen, Netherlands, assignor to Stamicarbon N.V., Heerlen, Netherlands
No Drawing. Filed Dec. 18, 1956, Ser. No. 628,959
Claims priority, application Netherlands Dec. 21, 1955
5 Claims. (Cl. 260—448)

The present invention relates to the preparation of diethyl aluminum chloride.

It is known that when aluminum is dissolved in ethyl chloride, a mixture of ethyl aluminum dichloride and diethyl aluminum chloride is formed. The mixture is called ethyl aluminum sesquichloride. The dichloride contained in this mixture may be converted into the monochloride by reacting it with triethylaluminum. This process of preparing diethyl aluminum chloride has the disadvantage that valuable triethyl aluminum must be used as a starting material.

It is an object of the present invention to prepare diethyl aluminum chloride by a simpler and more economical process than has been employed in the past.

It is a further object to prepare diethyl aluminum chloride while at the same time eliminating the formation of by-products.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects of the present invention can be attained and diethyl aluminum chloride can be obtained in excellent yields by distributing aluminum trichloride in a suspension containing an ethyl zinc halide and resulting from a reaction between zinc and an ethyl halide in the presence of an inert organic liquid and subsequently heating this mixture to 60 to 250° C. and distilling the diethyl aluminum chloride formed from the reaction mixture.

The ethyl zinc halide can be ethyl zinc chloride, ethyl zinc bromide, ethyl zinc iodide or a mixture of two or more of such ethyl zinc halides.

In order to obtain the suspension containing ethyl zinc halide, finely divided zinc is reacted with an ethyl halide, e.g., ethyl chloride, ethyl bromide or ethyl iodide. The preferred ethyl halide is ethyl bromide (see Job and Reich: Bul. Soc. Chim. de France, vol. 33, page 1424 (1923)). In order to accelerate the reaction, it is preferred to employ a mixture of ethyl bromide and ethyl iodide. When a mixture of ethyl bromide and ethyl iodide is employed, they are generally used in an amount of 0.1 mol to 1 mol of ethyl iodide for each mol of ethyl bromide. Most preferably, they are employed in equimolar amounts. The zinc and ethyl halide can be used in equimolecular amounts, although it has been found preferable to employ an excess up to 100% of the zinc.

Instead of pure zinc, there can be employed an alloy of zinc containing a small amount, e.g., 1 to 10% by weight of another metal or metals, such as copper or sodium. The presently preferred source of elemental zinc is a zinc-copper alloy.

The preferred inert liquids are saturated hydrocarbons, such as n-hexane, cyclohexane, n-heptane, n-octane, n-decane, n-dodecane, n-tetradecane, 2-methylhexane, 3-methylhexane, 2,2-dimethylpentane, 2,2,3-trimethylbutane, 3-ethylpentane, decahydronaphthalene. There can also be used other inert liquids, such as the aromatic hydrocarbons, e.g., benzene, toluene, o-xylene, m-xylene, p-xylene, α-methylnaphthalene, β-methylnaphthalene, etc., as well as other liquids such as fractions of natural hydrocarbons.

The reaction between the zinc and ethyl halide is difficult to start. In order to facilitate the start of this reaction, a small amount of ethyl zinc halide obtained in a previous preparation can be added, and the inert liquid can be added after the reaction has started.

During the reaction, further amounts of ethyl halide can be added. The ethyl halide can be dissolved in the inert liquid. The ethyl zinc halide formed by this reaction is poorly soluble in the liquid.

To the suspension obtained as the product of the reaction forming ethyl zinc halide, the aluminum trichloride is added in powdered form or suspended in an inert liquid. For convenience, the inert liquid is the same used in the preparation of the ethyl zinc halide suspension.

The reaction of the aluminum trichloride with the ethyl zinc halide, e.g., ethyl zinc bromide, can be represented by means of the equation:

From this equation, it can be seen that 0.5 mol of aluminum trichloride is required per mol of ethyl zinc bromide. Generally, however, it has been found desirable to employ a slight excess of the ethyl zinc halide, e.g., for each mol of aluminum trichloride there is preferably employed 2.05 to 2.20 mols of the ethyl zinc halide.

The amount of the inert liquid is not especially critical, but it should be used in an amount sufficient that a readily stirrable suspension is formed. Preferably, 30 to 60 parts of solvent are employed per 100 parts of the total reaction mixture including the aluminum trichloride. Of the solvent, preferably 40 to 60% is added during the reaction between the zinc and the ethyl halide and the balance is added with the aluminum trichloride.

Unless otherwise stated in the specification and claims, all parts and percentages are by weight.

*Example 1*

In a rection vessel equipped with reflux condenser 100 parts of a finely ground zinc-copper alloy containing 6% by weight of copper (the alloy containing 1.44 mols of zinc) were reacted, while being stirred, with 50 parts of ethyl iodide and 35 parts of ethyl bromide at a temperature of about 50° C. After the reaction had started a solution of 28 parts of ethyl iodide and 20 parts of ethyl bromide in 100 parts of cyclohexane was gradually added over one hour. The total amount of ethyl bromide was thus 0.5 mol, and of ethyl iodide also 0.5 mol. The resulting mixture was then boiled for four hours.

Subsequently, 60 parts of aluminum trichloride (0.44 mol) suspended in 100 parts of cyclohexane, were added over 30 minutes and the reaction mixture was boiled for one more hour.

Thereafter the cyclohexane was distilled off and the temperature raised to about 150° C., while the pressure was decreased, so as to distill the diethyl aluminum chloride from the raction mixture.

After the crude product separated out by distillation was redistilled at 113° C., and a pressure of 26 mm. mercury, 49 parts of diethyl aluminum chloride were obtained (a yield of 91% based on the aluminum trichloride).

*Example 2*

Example 1 was repeated using 100 parts of finely ground zinc in place of the zinc-copper alloy. Substantially the same results were obtained.

I claim:

1. A single stage process for the preparation of diethyl aluminum chloride with the substantial elimination of the formation of by-products, comprising mixing one mol aluminum trichloride with 2.05 to 2.20 mols of ethyl zinc halide and an inert organic liquid, heating the mixture to reaction temperature and then recovering the diethyl aluminum chloride formed.

2. A process according to claim 1 wherein the ethyl zinc halide is ethyl zinc bromide.

3. A process according to claim 1 wherein the ethyl zinc halide is a mixture of ethyl zinc bromide and ethyl zinc iodide.

4. A process according to claim 3 wherein the temperature of heating is 60–250° C.

5. A process according to claim 1 wherein the temperature of heating is 60–250° C.

References Cited in the file of this patent

UNITED STATES PATENTS 2,786,860    Ziegler et al. _____ Mar. 26, 1956

OTHER REFERENCES

Krause and von Grosse: "Die Chemie der metall-organischen Verbindung" (Berlin 1937), pp. 61 to 64, 784 and 785.

Sidgwick: "Chemical Elements and Their Compounds," vol. 1, published by Clarendon Press (Oxford, England), 1951 (page 265 relied on).